US005087905A

United States Patent [19]

Kuramatsu et al.

[11] Patent Number: 5,087,905

[45] Date of Patent: Feb. 11, 1992

[54] METHOD FOR SUPERIMPOSING INDEPENDENTLY TRANSMITTED DATA ON PAGER DISPLAY

[75] Inventors: Hiroyasu Kuramatsu; Toshifumi Sato; Masahiro Matai, all of Tokyo; Sadayuki Anma, Shizuoka, all of Japan

[73] Assignee: NEC Corporation, Tokyo, Japan

[21] Appl. No.: 540,427

[22] Filed: Jun. 19, 1990

[30] Foreign Application Priority Data

Jun. 19, 1989 [JP] Japan .................................. 1-156095
Jun. 19, 1989 [JP] Japan .................................. 1-157700

[51] Int. Cl.[5] .......................... H04Q 1/30; G08B 5/22
[52] U.S. Cl. .............................. 340/311.1; 340/825.44
[58] Field of Search ........... 340/311.1, 825.44, 825.47, 340/825.48

[56] References Cited

U.S. PATENT DOCUMENTS 4,956,641 9/1990 Matai et al. ...................... 340/311.1
4,959,644 9/1990 Sato ................................ 340/311.1

*Primary Examiner*—Donnie L. Crosland
*Attorney, Agent, or Firm*—Sughrue, Mion, Zinn, Macpeak & Seas

[57] ABSTRACT

Data contained in second and subsequent transmissions is superimposed on the basic data first transmitted to a pocket bell type portable pager having a liquid crystal display. A first mode superimposes all of the data in order of receipt while a second mode stores the first received data and superimposes only most recently received thereon. A ROM is provided which contains maps and the like type of predetermined image data. Locations, times and messages can be superimposed in either of the two modes on the maps etc.

9 Claims, 7 Drawing Sheets

(DISPLAYED PATTERN)

METHOD FOR SUPERIMPOSING INDEPENDENTLY TRANSMITTED DATA ON PAGER DISPLAY

BACKGROUND OF THE INVENTION

1. Field of the Invention

The present invention relates generally to a method for displaying a plurality of independently transmitted pieces of information on a pager display, and more specifically to a method for superimposing successively received messages or data on a pager display.

2. Description of the Prior Art

A radio pager which is equipped with a display has proven very popular in that a large amount of data can be transmitted at one calling as compared with an old style pager which alerts a person to call a predetermined phone number merely by means of sound and/or flashing light.

This type of known display equipped pager, however, has encountered drawbacks in that, during actual use of the display type pager, it is often the case that a person wishes to send an additional message after completing a call. In such a case, according to a prior art technique, it is necessary to prepare and transmit an entirely new call for sending the new message in which the previously sent message data also must be redundantly included. Further, it is also not seldom that, when a plurality of messages are successively transmitted, each message contains information which is at least in part duplicated in the previously transmitted ones.

SUMMARY OF THE INVENTION

It is an object of the present invention to provide a method by which previously transmitted information need not be redundantly transmitted to a portable display type pager in a subsequent call.

Another object of the present invention is to enable maps and other data to read out of a memory onboard the pager and to superimpose messages and the like thereon.

In brief, the above objects are achieved by an arrangement wherein data contained in second and subsequent transmissions is superimposed on the basic data first transmitted to the pager. A first mode superimposes the data in the order of receipt while a second mode stores the first received data and superimposes only most recently received thereon. A ROM is provided which contains maps and the like type of predetermined image data. Locations, times and messages can be superimposed in either of the two modes on the maps etc.

More specifically a first aspect of the present invention is deemed to come in a method of displaying information received by radio transmission which method features the steps of: receiving a first and sequential second to nth data transmissions; (a) determining, based on information contained in the first transmission, which of first and second superimposing modes the data contained in the second to nth data transmissions is to be imposed on the data contained in the first transmission; (b) superimposing the data contained in the second to nth transmissions on the data contained in the first transmission in the event that the first mode is selected; (c) superimposing the data contained in the nth transmission on the data contained in the first transmission in the event that the second mode is selected; and (d) producing an image on a display indicative of the superimposition.

A second aspect of the present invention is deemed come in that the above mentioned step (c) comprises the steps of: memorizing the data contained in the first transmission; recalling the memorized data; and superimposing the data contained in the nth transmission on the recalled data.

A third aspect of the present invention is deemed to come in a method of operating a portable pager having a display, which method features the steps of: receiving a first and sequential second to nth radio data transmissions; determining, based on information contained in the first transmission, which of first and second superimposing modes the data contained in the second to nth data transmission is to be imposed on the data contained in the first transmission; superimposing the data contained in the second to nth transmissions on the data contained in the first transmission in the event that the first mode is selected; superimposing the data contained in the nth transmission on the data contained in the first transmission in the event that the second mode is selected; and producing an image on the display of the pager indicative of the most recent superimposition.

A further aspect of the invention comes in a method as set forth immediately above and which features the steps of storing predetermined image pattern data in a memory; reading out selected image pattern data from the memory in response to data contained in the first transmission; and using the data read out of memory as the data on which the data contained in the second to nth transmissions is superimposed.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 2:
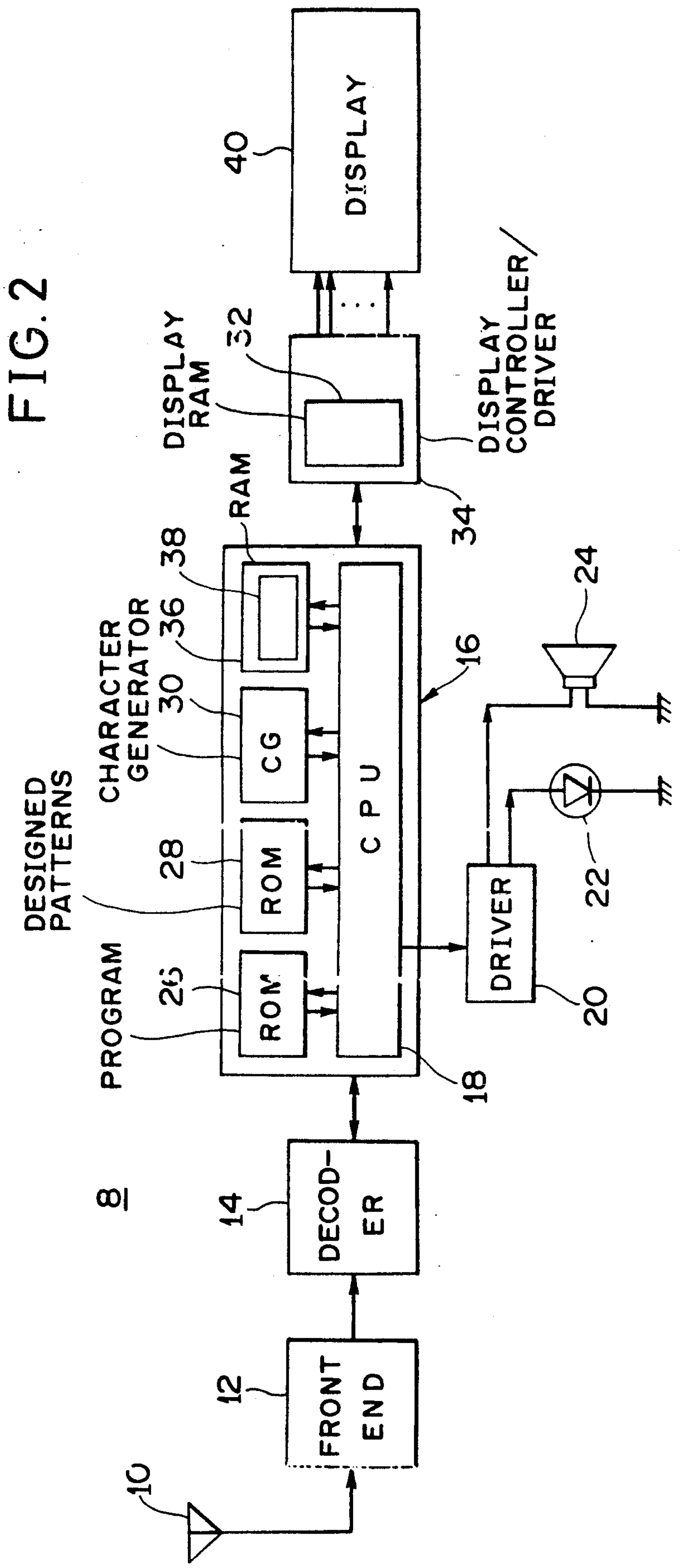
FIG. 2 is a block diagram showing an example of a hardware arrangement (pocket pager) to which the present invention can be applied.
Figure 2:
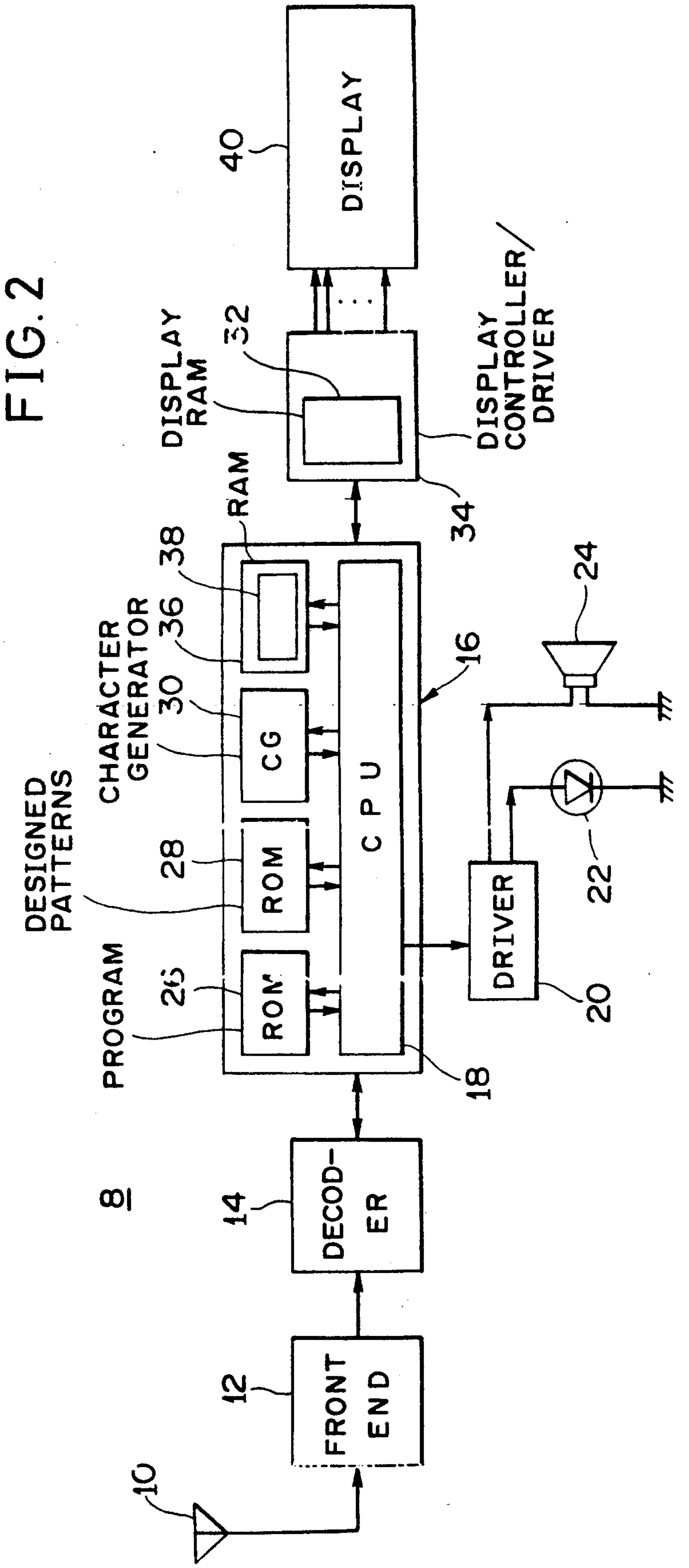

FIGS. 1A-1C are a schematic representation which shows a standard code format proposed by the POCSAG (British Post Office Code Standardization Advisory Group). Although this invention is not limited to such a code format, it is believed a brief description thereof will facilitate an understanding of this invention. According to the PSCSAG specification, a transmission consists of a preamble P followed by batches 1, 2, 3, . . . , each batch beginning with a synchronization codeword (SC) as shown in FIG. 1A.

The transmission ceases when there are no further calls. Each transmissions starts with a preamble to permit the recipient pager to attain bit synchronization and to prepare to acquire word synchronization. The preamble is a pattern of reversals, 101010 . . . , repeated for a period of at least 576 bits, i.e., the duration of a batch plus a codeword. As shown in FIG. 1B, codewords are transmitted in batches each of which comprises an SC followed by 8 groups or frames each containing 2 codewords. According to the specification of the POCSAG, the number of message bits is 20.

FIG. 1C shows in detail the message section (shown in FIG. 1B) and that portion of a batch to which the present invention is particularly directed. This message section is divided into three parts: (a) a message number section (4 bits), (b) a display position (4 bits) and (c) a display data section (12 bits). It should be noted that the just mentioned number of bits are quoted merely by way of example, and it goes without saying that the number of bits of each section is in no way limited thereto. Further reference to FIG. 1C will be made later in the instant disclosure.

FIG. 2, shows schematically an arrangement of a pager 8 to which the present invention is applicable. A front end 12 is provided for amplifying and demodulating a code-modulated carrier wave received by an antenna 10. The front end 12 is a conventional circuit arrangement comprised of a high frequency amplifier, a frequency converter, an IF amplifier, and a discriminator. The output of the front end 12 is applied to a decoder 14 which searches for an identifying address code by comparing the same with a subscriber's unique code prestored in a PROM (Programmable Read Only Memory) within the decoder 14 (not shown in the drawings). In the event that the identifying address code coincides with the subscriber's unique code, the decoder 14 activates a control section 16 and then applies the message data included in the calling signal. When the control section 16 is activated, a CPU (Central Processing Unit) 18 enables a driver 20 which in turn operates one or both of a light source (LED for example) 22 and a speaker 24 for alerting the subscriber.

A first ROM 26 is provided for storing a program which controls the overall operations of the pager 8, while a second ROM 28 is provided for storing a plurality of pre-determined patterns which are selectively read out in response to identifying codes. A character generator 30 is operatively connected to the CPU for generating visual characters or symbols from coded data inputted from the decoder 14. The pre-determined patterns and/or characters, etc., read out from the ROM 28 and the character generators, are applied to a display RAM 32 within a display controller/driver 34. A RAM (Random Access Memory) 36 is used to define a work space 38, and includes therein a storage area for storing data or messages transmitted from a caller.

The CPU 18 controls the operations of the pager 8 using the program stored in the ROM 26. A display controller/driver 34 applies the data stored in the display RAM 32 to a display 40.

Figure 3A:
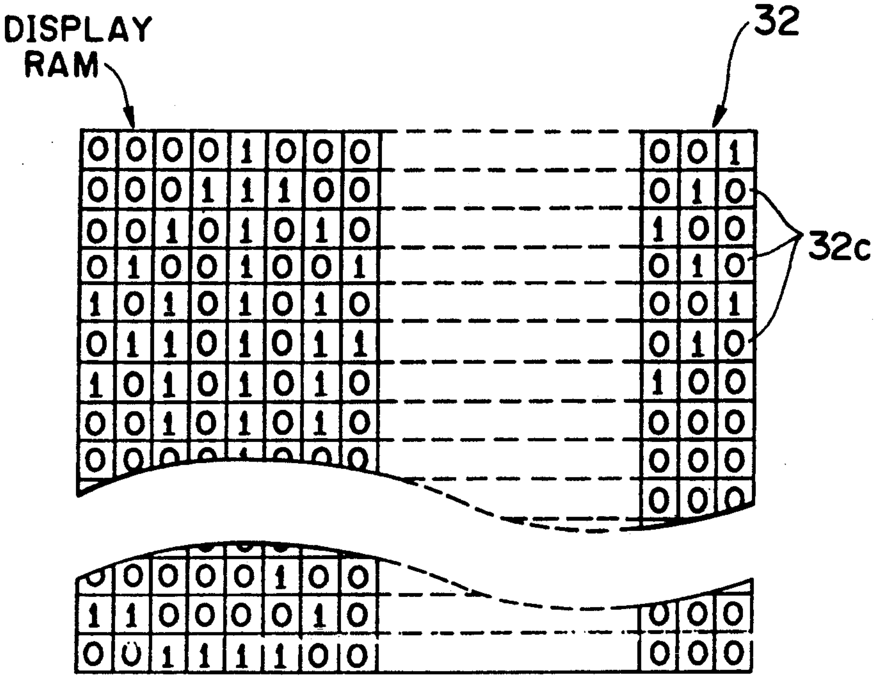
FIG. 3A is a schematic representation of a display RAM used in the arrangement shown in FIG. 2.
Figure 3B:
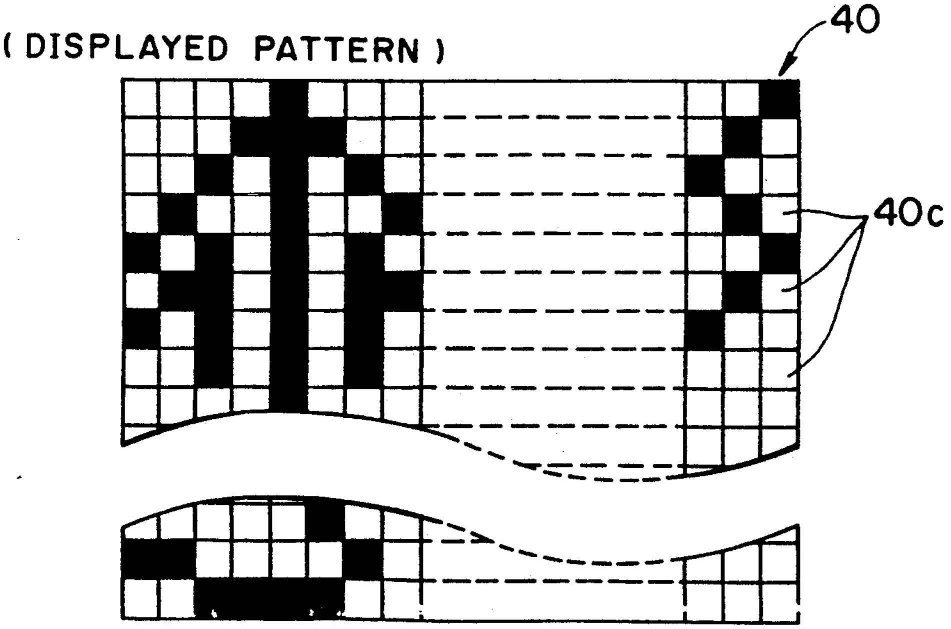
FIG. 3B is a depiction of the image which is produced by the display RAM shown in FIG. 3A.

FIG. 3A schematically illustrates the RAM 32 which comprises a plurality of bit storage cells arrange in a matrix, while FIG. 3B illustrates a pattern shown on the display 40. The pattern displayed exactly corresponds to the content of the RAM 32 (FIG. 3A). That is to say, the memory cells 32*c* correspond to the display cells 40*c* in a one to one relationship.

Figure 4:
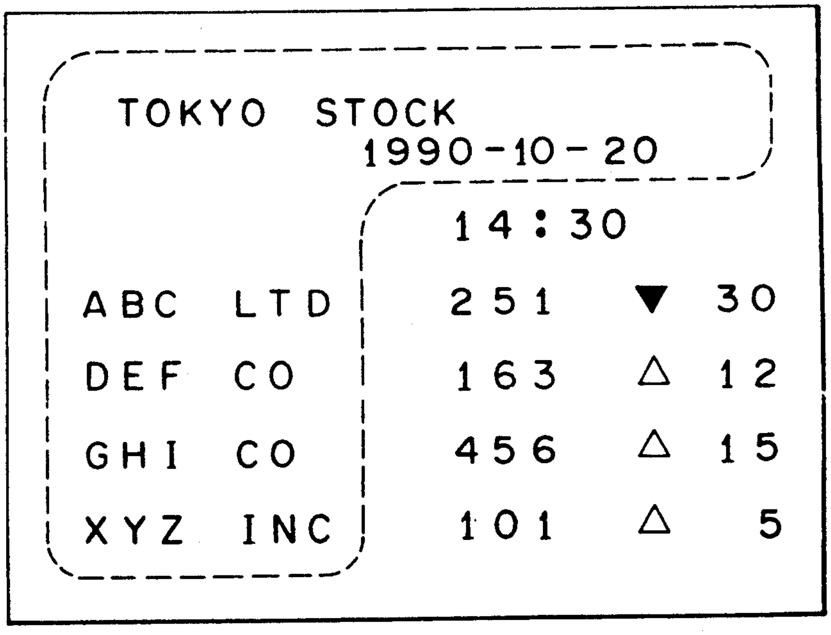
FIG. 4 shows an example of the type of image which can be produced and which distinguishes the data which needs to be updated on a regular basis from the data which need be input only occasionally.

FIG. 4 shows one example of data which can be displayed. In this example stock market data displayed and respective prices etc., are periodically updated (at 30 minute intervals merely by way of example). As will be appreciated, the data enclosed within the broken line is always the same for any given day. Viz, the date and the company names will not vary. On the other hand the data outside of the broken line area will be subject to periodic change and therefore is the only data which need be transmitted on a regular basis. By reducing the data which need be transmitted to only that which will be subject to regular change, the transmission efficiency can be markedly increased.

Figure 5:
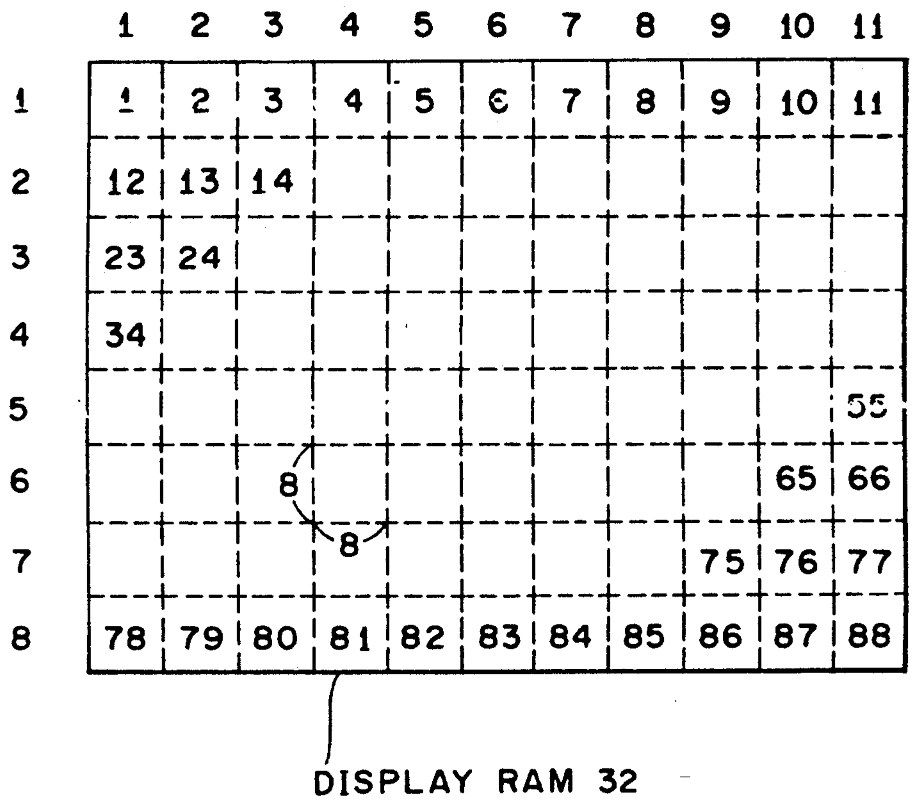
FIG. 5 is a second schematic example of a display RAM of the type used in the FIG. 2 circuitry.

FIG. 5 illustrates the display RAM shown in FIG. 3A in terms of memory cell blocks. In this particular example each cell is composed of $8 \times 8$ dots while the RAM includes $11 \times 8$ cells. As shown section (C) of FIG. 1 the 4 display position bits are such as to specify the cell (e.g. cell 14) from which the data to be displayed should start.

Figure 6:
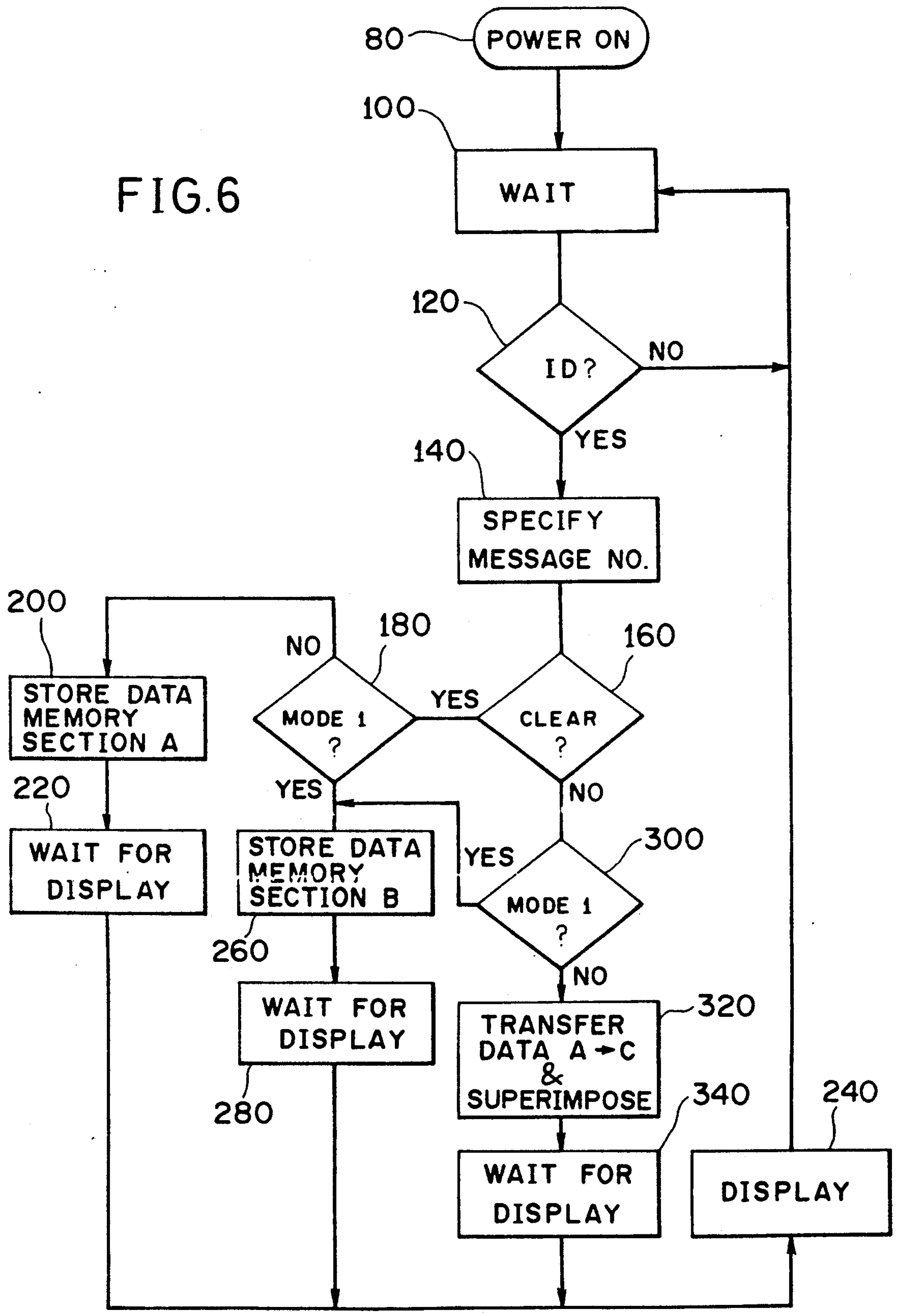
FIG. 6 is a flow chart which shows the steps which characterize the operation of the present invention as applied to the FIG. 2 circuitry.

Before discribing the flow chart shown in FIG. 6 it is deemed necessary to generally describe the two basic modes which characterize the present invention.

The first mode or Mode 1 as it will be referred to hereinafter, is such that all data included in successive data transmissions (e.g. messages) are superimposed on the data included in the first transmission, in the order of receipt.

The superimposing process is carried out in the work space 38 of the RAM 36 and then the superimposed image data is transferred to the display RAM 32 and thereafter displayed on display 40.

On the other hand, the second mode or Mode 2, is such the data included in the first transmission is set in memory and upon receipt of each subsequent data transmission the memorized data from the first transmission, is recalled and the data included in the most recent data transmission (only) is superimposed thereon. The resultant image retained in the work space 38 until receipt of the next data transmission.

Turning now to FIG. 6, the first step (step 80) of the routine illustrated in flow chart form, comprises the pager being switched on. Following this, at step 100 a data transmission is awaited. Upon receipt of a transmission including a subscriber's identification the routine flow to step 140 wherein a message number, which identifies one of a plurality of files stored in the RAM 36 is extracted from the received signal. At step 160 it is determined if the received data is contained in a new call (viz., a call which has not yet been received since the page was last switched on).

In the event of a new call, a clear command is issued which removes residual data from the memory sections used and the routine flow to step 180 wherein it is determined if the operational mode is to be Mode 1 or Mode 2. For example this can be indicated by a predetermined bit in the message No. data (see left hand end of FIG. 1C, assuming a "1" to "0" value. Alternatively, if a caller selected a display position which is not available (such as a position 99 in the case shown in FIG. 5), the pager determines such information as a clear command.

In the event that Mode 1 is indicated, the routine goes to step 260 wherein the data transmitted is stored in a memory section B within work space 38. Following this the routine flows to step 280 wherein the issuance of a display command is awaited. Upon issuance of this command the data stored in the memory section B is transferred to the display RAM 32 and subsequently displayed in step 240.

On the other hand, in the event that a Mode 2 requirement is detected in step 180, the routine goes to step 200. In this step, the transmitted data is stored in a memory section A of the work space 38. At step 220 the issuance of a display command is awaited.

At step 160 if the transmitted data is the second or subsequent transmission, the routine goes to step 300 wherein the required mode is determined. If Mode 1 is indicated then at step 260 the incoming data is superimposed on the already existing data which is held in memory section B. As will be appreciated this enables data to be complied which induces the display of a image which includes all of the images or messages thus far transmitted.

On the other hand, if Mode 2 is indicated as being the required mode in step 300, the routine flows to step 320 wherein the first received data which is being held in memory section A of the work space 38, is transferred to a fresh section which shall be referred to a section C. Following this, the most recently received data is superimposed on the transferred data. As will be appreciated this produces image data which is composed of the data of the first received transmission with only the data contained in the most recently received transmission. The routine then awaits the issuance of the display signal in step 340. As an alternative, the first received data which is being held in memory section A can be transferred to memory section B in order to save memory capacity.

Figure 7A:
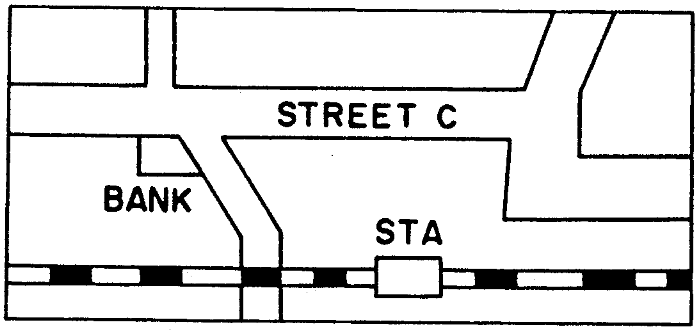
FIGS. 7A, 7B and 7C are drawings which illustrate the use of the superimposing which is possible with the present invention in combination with prerecorded map and the like type of image data.

A further feature of the invention comes in the use of prestored data which can be selectively read out of ROM 28 and used in combination with the data contained in the transmission or transmissions (depending on the selected Mode). By way of example, the data stored in the ROM 28 can be a plurality of maps or predetermined images, patterns etc. The map shown in FIG. 7A for example, can be called out of ROM in response to a suitable identification code contained in the message No. portion (see FIG. 1C). In the case of Mode 1, the map data will stored in section B of the work space 38 while in the event of Mode 2 the same data would be stored in memory section A.

Figure 7B:
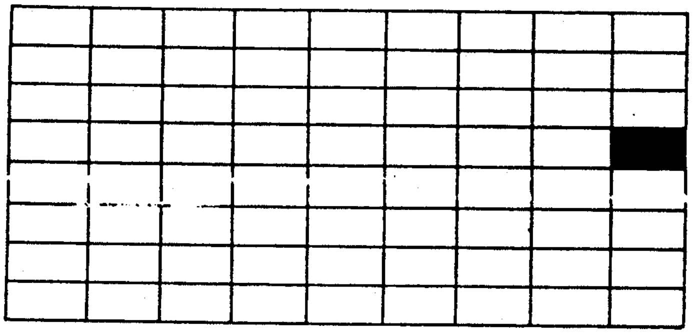
Figure 7C:
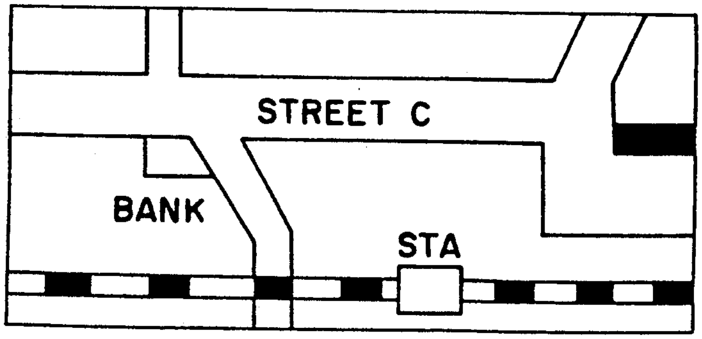

FIG. 7B depicts an image which results from a subsequent (second) transmission. In the case of Mode 1, the image shown in FIG. 7B will be superimposed on the image shown in FIG. 7A and thus result in the image shown in FIG. 7C.

In the case of Mode 2, it is possible if the location indicated in FIG. 7B should need to be changed due to shift in circumstances, to replace the first identified position with a new one. Conversely, with Mode 1 it is possible, for example, to develop a meeting schedule by indicating "Mr. Jones 10.00 AM" and then add "Mr. Smith 1.00 PM" (in a later transmission) at the same or different location as the need be.

While the foregoing description describes only two embodiments of the present invention, the various alternatives and modifications possible without departing from the scope of the present invention, which is limited only by the appended claims, will be apparent to those skilled in the art.

What is claimed is:

1. A method of displaying information received by radio transmission, comprising:

receiving a first and sequential second to nth data transmissions;

(a) determining, based on information contained in the first transmission, which of first and second superimposing modes the data contained in the second to nth data transmissions is to be imposed on the data contained in the first transmission;

(b) superimposing the data contained in the second to nth transmissions on the data contained in the first transmission in the event that the first mode is selected;

(c) superimposing the data contained in the nth transmission on the data contained in the first transmission in the event that the second mode is selected; and (d) producing an image on a display indicative of the superimposition.

2. A method as claimed in claim 1 wherein step (c) comprises the steps of:

memorizing the data contained in the first transmission;

recalling the memorized data; and superimposing the data contained in the nth transmission on the recalled data.

3. A method of operating a portable pager having a display, comprising the steps of:

receiving a first and sequential second to nth radio data transmissions;

determining, based on information contained in the first transmission, which of first and second superimposing modes the data contained in the second to nth data transmissions is to be imposed on the data contained in the first transmission;

superimposing the data contained in the second to nth transmissions on the data contained in the first transmission in the event that the first mode is selected;

superimposing the data contained in the nth transmission on the data contained in the first transmission in the event that the second mode is selected; and producing an image on the display of the pager indicative of the most recent superimposition.

4. A method as claimed in claim 3 further comprising the steps of:

storing predetermined image pattern data in a memory;

reading out selected image pattern data from the memory in response to data contained in the first transmission; and using the data read out of memory as the data on which the data contained in the second to nth transmissions is superimposed.

5. A portable device having a display for displaying information received by radio transmission, comprising:

means for receiving a first and sequential second to nth data transmissions;

means for determining, based on information contained in the first transmission, which of first and second superimposing modes the data contained in the second to nth data transmissions is to be imposed on the data contained in the first transmission;

means for superimposing the data contained in the second to nth transmissions on the data contained in the first transmission in the event that the first mode is selected;

means for superimposing the data contained in the nth transmission on the data contained in the first transmission in the event that the second mode is selected; and means for producing an image on the display of the portable device indicative of the superimposition.

6. A portable device as claimed in claim 5 further comprising:

means for memorizing the data contained in the first transmission;

means for recalling the memorized data; and means for superimposing the data contained in the nth transmission on the recalled data.

7. A portable pager having a display, comprising:

means for receiving a first and sequential second to nth radio data transmissions;

means for determining, based on information contained in the first transmission, which of first and second superimposing modes the data contained in the second to nth data transmissions is to be imposed on the data contained in the first transmission;

means for superimposing the data contained in the second to nth transmissions on the data contained in the first transmission in the event that the first mode is selected;

means for superimposing the data contained in the nth transmission on the data contained in the first transmission in the event that the second mode is selected; and means for producing an image on the display of the pager indicative of the most recent superimposition.

8. A portable pager as claimed in claim 7 further comprising:

means for storing predetermined image pattern data in a memory;

means for reading out selected image pattern data from the memory in response to data contained in the first transmission; and means for using the data read out of memory as the data on which the data contained in the second to nth transmissions is superimposed.

9. A portable pager having a display, comprising:

receiving means for receiving a first and sequential second radio data transmissions;

determining means for determining, based on information contained in the first transmission whether or not the data contained in the second data transmission is to be superimposed on the data contained in the first transmission;

superimposing means for superimposing the data contained in the second transmissions on the data contained in the first transmission in response to the result obtained from said determining means; and means for producing an image on the display of the pager indicative of the most recent superimposition.

* * * * *

UNITED STATES PATENT AND TRADEMARK OFFICE

CERTIFICATE OF CORRECTION

PATENT NO. : 5,087,905

DATED : February 11, 1992

INVENTOR(S) : Hiroyasu Kuramatsu et al.

Figure 1:
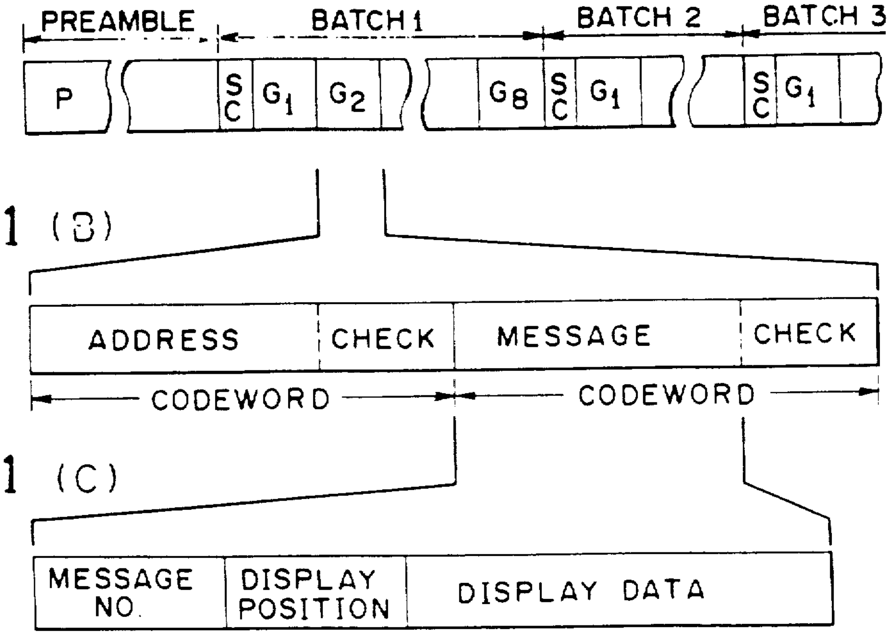
FIGS. 1A-1C show a POCSAG type standard code format of the type to which instant invention is applicable.

It is certified that error appears in the above-indentified patent and that said Letters Patent is hereby corrected as shown below:

Drawing sheet 1 of 7 should be deleted to be replaced with drawing sheet, consisting of Fig. 1, as shown on the attached page.

Col. 4, line 2 delete "arrange" and insert --arranged--.

Col. 4, line 28 delete "discribing" and insert --describing--.

Signed and Sealed this

Tenth Day of August, 1993

Attest:

Michael K. Kirk

MICHAEL K. KIRK

Attesting Officer

Acting Commissioner of Patents and Trademarks